US009528696B2

(12) United States Patent
Bach et al.

(10) Patent No.: US 9,528,696 B2
(45) Date of Patent: Dec. 27, 2016

(54) APPLIANCE WITH DEAD FRONT USER INTERFACE

(71) Applicant: General Electric Company, Schenectady, NY (US)

(72) Inventors: James Carter Bach, Seymour, IN (US); Jaime Alexander McPherson, Signal Mountain, TN (US)

(73) Assignee: Haier U.S. Appliance Solutions, Inc., Wilmington, DE (US)

(*) Notice: Subject to any disclaimer, the term of this patent is extended or adjusted under 35 U.S.C. 154(b) by 91 days.

(21) Appl. No.: 14/709,725

(22) Filed: May 12, 2015

(65) Prior Publication Data

US 2016/0334094 A1 Nov. 17, 2016

(51) Int. Cl.

| | |
|---|---|
| ***G01D 11/28*** | (2006.01) |
| ***F21V 33/00*** | (2006.01) |
| ***F21V 9/10*** | (2006.01) |
| ***F24C 7/08*** | (2006.01) |

(52) U.S. Cl.

CPC ............. *F21V 33/0044* (2013.01); *F21V 9/10* (2013.01); *F24C 7/082* (2013.01); *F24C 7/083* (2013.01)

(58) Field of Classification Search

CPC ............ F21V 33/0044; G02F 1/133604; G02F 1/133617; G02F 2001/133614

See application file for complete search history.

(56) References Cited

U.S. PATENT DOCUMENTS

| | | | | |
|---|---|---|---|---|
| 8,223,131 | B2 * | 7/2012 | Rudolph | F24C 7/085 219/506 |
| 8,578,293 | B2 * | 11/2013 | Breunig | F24C 7/082 715/812 |
| 8,604,393 | B2 | 12/2013 | Odriozola | |
| 8,606,180 | B2 * | 12/2013 | Santinato | A47L 15/4293 219/413 |
| 2005/0073823 | A1 * | 4/2005 | Engelmann | A47L 15/4293 362/23.07 |
| 2008/0225016 | A1 | 9/2008 | Lee | |
| 2008/0264931 | A1 | 10/2008 | Vilato et al. | |
| 2011/0062143 | A1 * | 3/2011 | Satanek | F24C 7/085 219/489 |
| 2012/0132191 | A1 * | 5/2012 | Cadima | F24C 7/082 126/39 R |
| 2013/0056457 | A1 * | 3/2013 | Lee | F24C 7/083 219/620 |
| 2014/0146530 | A1 * | 5/2014 | Guiset | G09F 9/33 362/230 |
| 2014/0192013 | A1 | 7/2014 | Lubert et al. | |

* cited by examiner

*Primary Examiner* — Ali Alavi

(74) *Attorney, Agent, or Firm* — Dority & Manning, P.A.

(57) ABSTRACT

An appliance and a user interface assembly configured to provide a uniform user interface background appearance when features of the user interface are not illuminated are provided. More specifically, an ink may be applied to a component of the user interface assembly such that when light is directed toward the ink to illuminate the features, the light passes through the ink to the user interface and the illuminated features of the user interface are clearly visible against the background of the user interface. However, when light is not directed toward the ink to illuminate the features, the user interface appears to be a substantially opaque, uniform color. Thus, the user interface may have a dead front appearance.

20 Claims, 4 Drawing Sheets

APPLIANCE WITH DEAD FRONT USER INTERFACE

FIELD OF THE INVENTION

The subject matter of the present disclosure relates generally to user interface assemblies for appliances, in particular cooktop appliances.

BACKGROUND OF THE INVENTION

Cooktop appliances typically can include a variety of configurations. As an example, cooktop appliances may use a glass and/or ceramic-glass cooking panel for supporting cooking utensils. For such cooktop appliances, the heating sources can include, e.g., radiant, induction, and gas on glass. A variety of controls can be provided for the heating sources such as, e.g., traditional rotatable knobs and/or electronic types that rely on sensitivity to a user's touch. These controls may be provided as part of a user interface assembly for controlling various operations of the cooktop appliance. Similarly, other appliances, such as, e.g., washing machine appliances, refrigerator appliances, and the like, may use user interface assemblies for controlling various operations of the appliance.

Such user interface assemblies may use a variety of lighted text, digits, symbols, and/or other features to display information to a user of the appliance on the surface of the appliance. For example, in cooktop appliances, the upper surface of the cooking panel may include a user interface area where the controls are located, as well as where information, such as, e.g., whether a heating element is activated or at what heat level a heating element is set, may be displayed to the user using lighted text, digits, and/or symbols. Some user interface assemblies display such information on a generally clear or translucent substrate, which is painted or coated to provide a background for the lighted text, digits, symbols, and/or other features and to hide from the user's view the internal components of the user interface and/or components of the appliance. Openings in the paint or coating applied to the substrate allow light to pass through the user interface area to illuminate the text, digits, symbols, and/or other features that provide information to the user.

Because no paint or coating is applied in the openings, the background is disrupted in these areas, and the components positioned behind or below the substrate may be visible to the user when no light is passing through the openings. The disruption of the background and/or the visibility of the components may be unattractive or distracting to users of the appliance. That is, consumers may prefer that the user interface is consistent or uniform in color and appearance when the text, digits, symbols, and/or other features are not illuminated. However, the text, digits, symbols, and/or other features of the user interface should be clearly and easily visible to the user when the features are illuminated. A commonly used term for this sort of user interface behavior, that is, obscuring or hiding features when the appliance or features are in an off-state so as to present a seemingly contiguous surface, is "Dead Front."

Accordingly, an appliance configured to provide an essentially uniform and/or contiguous user interface when features of the user interface are not illuminated would be beneficial. An appliance further configured to provide a user interface with clearly visible illuminated features also would be useful. A user interface assembly configured to provide clearly visible features when the features are illuminated but appear substantially uniform when the features are not illuminated would be advantageous.

BRIEF DESCRIPTION OF THE INVENTION

The present invention provides an appliance and a user interface assembly configured to provide a uniform user interface when features of the user interface are not illuminated. More specifically, an ink may be applied to a component of the user interface assembly such that when light is directed toward the ink, the light passes through the ink to the user interface and the illuminated features of the user interface are clearly visible. However, when light is not directed toward the ink, the features are not illuminated and the user interface appears to be a substantially opaque, uniform color. Additional aspects and advantages of the invention will be set forth in part in the following description, may be apparent from the description, or may be learned through practice of the invention.

In a first exemplary embodiment, a user interface assembly is provided. The user interface assembly includes a user interface substrate having a primary surface and a secondary surface opposite the primary surface, the primary surface accessible by a user of the user interface assembly; an opaque coating selectively applied to the secondary surface of the user interface substrate such that a portion of the secondary surface is uncoated, the uncoated portion defining a window; a display assembly spaced apart from the user interface substrate, the display assembly having a light source for directing light through the window to illuminate a feature of the user interface assembly; and a light transmissive layer disposed between the user interface substrate and the display assembly. The light transmissive layer includes a support substrate having a first surface facing the user interface and a second surface facing the display assembly, and a first ink applied to at least a portion of the support substrate, the first ink configured such that when the light source is not directing light to the window, the user interface substrate appears to be an opaque, essentially uniform color.

In a second exemplary embodiment, a cooktop appliance is provided. The cooktop appliance includes a cooking panel for supporting a cooking utensil thereon; and a user interface assembly. The user interface assembly includes a user interface substrate having a primary surface and a secondary surface opposite the primary surface, the primary surface accessible to a user of the user interface assembly; an opaque coating selectively applied to the secondary surface of the user interface substrate such that a portion of the secondary surface is uncoated, the uncoated portion defining a window; a display assembly spaced apart from the user interface substrate, the display assembly having a light source for directing light through the window to illuminate a feature of the user interface assembly; and a light transmissive layer disposed between the user interface substrate and the display assembly. The light transmissive layer has a support substrate having a first surface facing the user interface substrate and a second surface facing the display assembly, and a first ink applied to at least a portion of the support substrate, the first ink configured such that when the light source is not directing light to the window, the user interface substrate appears to be an opaque, essentially uniform color.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Use of the same reference numerals in different figures denotes the same or similar features.

DETAILED DESCRIPTION OF THE INVENTION

Figure 1:
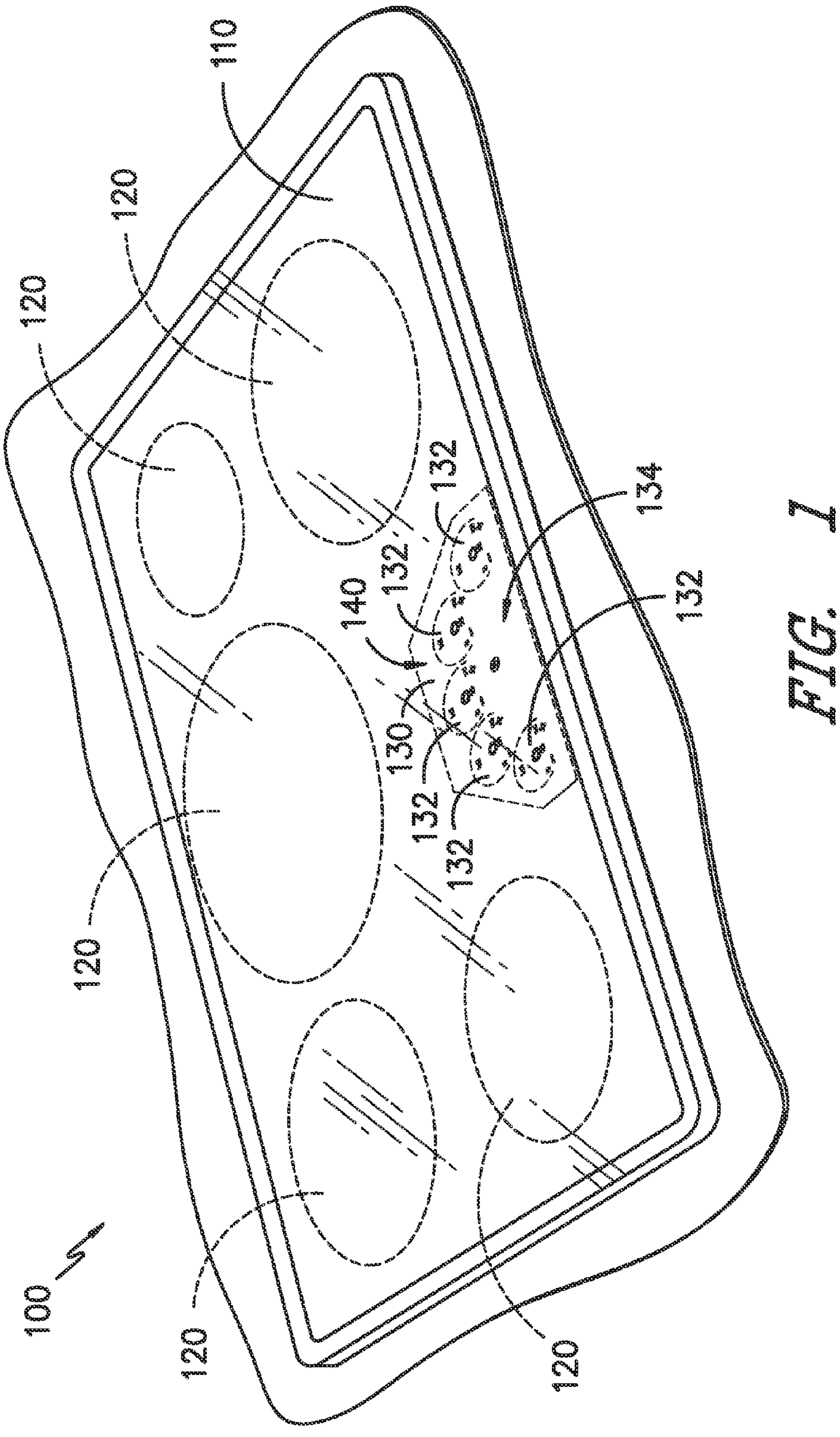
FIG. 1 provides a top perspective view of an exemplary embodiment of a cooktop appliance of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a top, perspective view of a cooktop appliance 100 according to an exemplary embodiment of the present subject matter. Cooktop appliance 100 can be installed in various locations such as in cabinetry in a kitchen, with one or more ovens to form a range appliance, or as a standalone appliance. Thus, as used herein, the term "cooktop appliance" includes grill appliances, stove appliances, range appliances, and other appliances that incorporate cooktops, which are generally known as surface cooking appliances.

Cooktop appliance 100 includes a panel 110 for supporting thereon cooking utensils such as pots or pans. Panel 110 is a transparent material such, e.g., as a glass, ceramic, or combination glass-ceramic material. In some embodiments, panel 110 is substantially clear, and in other embodiments, panel 110 may be a colored transparent material. Heating assemblies 120 are mounted below panel 110 such that heating assemblies 120 are positioned below panel 110, e.g., along a vertical direction V. While shown with five heating assemblies 120 in the exemplary embodiment of FIG. 1, cooktop appliance 100 may include any number of heating assemblies 120 in alternative exemplary embodiments. Heating assemblies 120 can also have various diameters. For example, each heating assembly 120 can have a different diameter, the same diameter, or any suitable combination thereof. Further, each heating assembly 120 may include one or more heating elements or zones.

Cooktop appliance 100 is provided by way of example only and is not limited to the exemplary embodiment shown in FIG. 1. For example, a cooktop appliance having one or more heating assemblies 120 in combination with one or more electric or gas burner heating elements can be provided. In addition, various combinations of number of heating assemblies 120, position of heating assemblies 120, and/or size of heating assemblies 120 can be provided. Moreover, heating assemblies 120 can have a variety of constructions for the input of energy in the form of heat to the cooking utensils. For example, heating assemblies 120 can be constructed as electric radiant, electric induction, or gas-on-glass heating sources. Mechanisms associated with each such type of heating source are positioned under panel 110 and will be well understood of one of skill in the art using the teachings disclosed herein.

A user interface assembly 140 provides visual information to a user and allows a user to select various options for the operation of cooktop appliance 100. For example, displayed options can include a desired heating assembly 120, a desired cooking temperature, and/or other options. In some embodiments, a variety of illuminated text, digits, symbols, and/or other features may be displayed in or on a user interface substrate 130 of assembly 140 to convey information to a user. User interface assembly 140 can be any type of input device and can have any configuration. In FIG. 1, a portion of panel 110 comprises user interface substrate 130. In other embodiments, user interface substrate 130 may be a separate panel or component positioned within or at least partially surrounded by cooking panel 110. Alternatively, user interface substrate 130 can be a separate panel or component positioned on a vertical or slanted surface near a front side of cooktop appliance 100 or anywhere convenient for a user to access during operation of cooktop appliance 100. In some embodiments, cooktop appliance 100 may be a range cooktop, and in such embodiments, user interface substrate 130 may be positioned on, e.g., a rear backsplash or front bezel of the range.

Also, although described with respect to cooktop appliance 100, it should be readily understood that user interface assembly 140 as described herein could be used with any suitable appliance. When used with other appliances, such as, e.g., washing machine appliances, dryer appliances, and/or refrigerator appliances, panel 110 may be constructed of glass, ceramics, plastics, and/or combinations thereof. Suitable plastic materials may include acrylics, polyethylene terephthalate ("PET"), or the like. In some embodiments, user interface substrate 130 of assembly 140 is incorporated into or may form the control panel of an appliance; for example, user interface substrate 130 may be incorporated into a backsplash of a washing machine or dryer appliance.

In the exemplary embodiment shown in FIG. 1, user interface assembly 140 includes one or more capacitive touch input components 132. Touch input components 132 can be used as part of a capacitive touch sensing system and can allow for the selective activation, adjustment or control of any or all heating assemblies 120 as well as any timer features or other user adjustable inputs. One or more of a variety of electrical, mechanical or electro-mechanical input devices including rotary dials, push buttons, toggle/rocker switches, and/or touch pads can also be used singularly or in combination with touch input components 132. User interface 130 also includes a display component 134, such as a digital or analog display device designed to provide operational feedback to a user. User interface assembly 140 may further be provided with one or more graphical display devices that deliver certain information to the user such as, e.g., whether a particular heating assembly is activated and the level at which the heating element is set.

Operation of cooktop appliance 100 can be regulated by a controller (not shown) that is operatively coupled i.e., in communication with, user interface assembly 140 and heating assemblies 120. For example, in response to user manipulation of a touch input component 132, the controller operates one of heating assemblies 120. The controller is also provided with other features. By way of example, the controller may include a memory and one or more processing devices such as microprocessors, CPUs or the like, such as general or special purpose microprocessors operable to execute programming instructions or micro-control code associated with operation of appliance 100. The memory may represent random access memory such as DRAM, or read only memory such as ROM or FLASH. In one embodiment, the processor executes programming instructions stored in memory. The memory may be a separate component from the processor or may be included onboard within the processor.

The controller may be positioned in a variety of locations throughout cooktop appliance 100. In the illustrated embodiment, the controller may be located under or next to user interface substrate 130. In such an embodiment, input/output ("I/O") signals are routed between the controller and various operational components of appliance 100 such heating assemblies 120, touch input components 132, sensors, graphical displays, and/or one or more alarms. In one embodiment, the user interface 130 may represent a general purpose I/O ("GPIO") device or functional block. User interface 130 may be in communication with the controller via one or more signal lines or shared communication busses.

Figure 2:
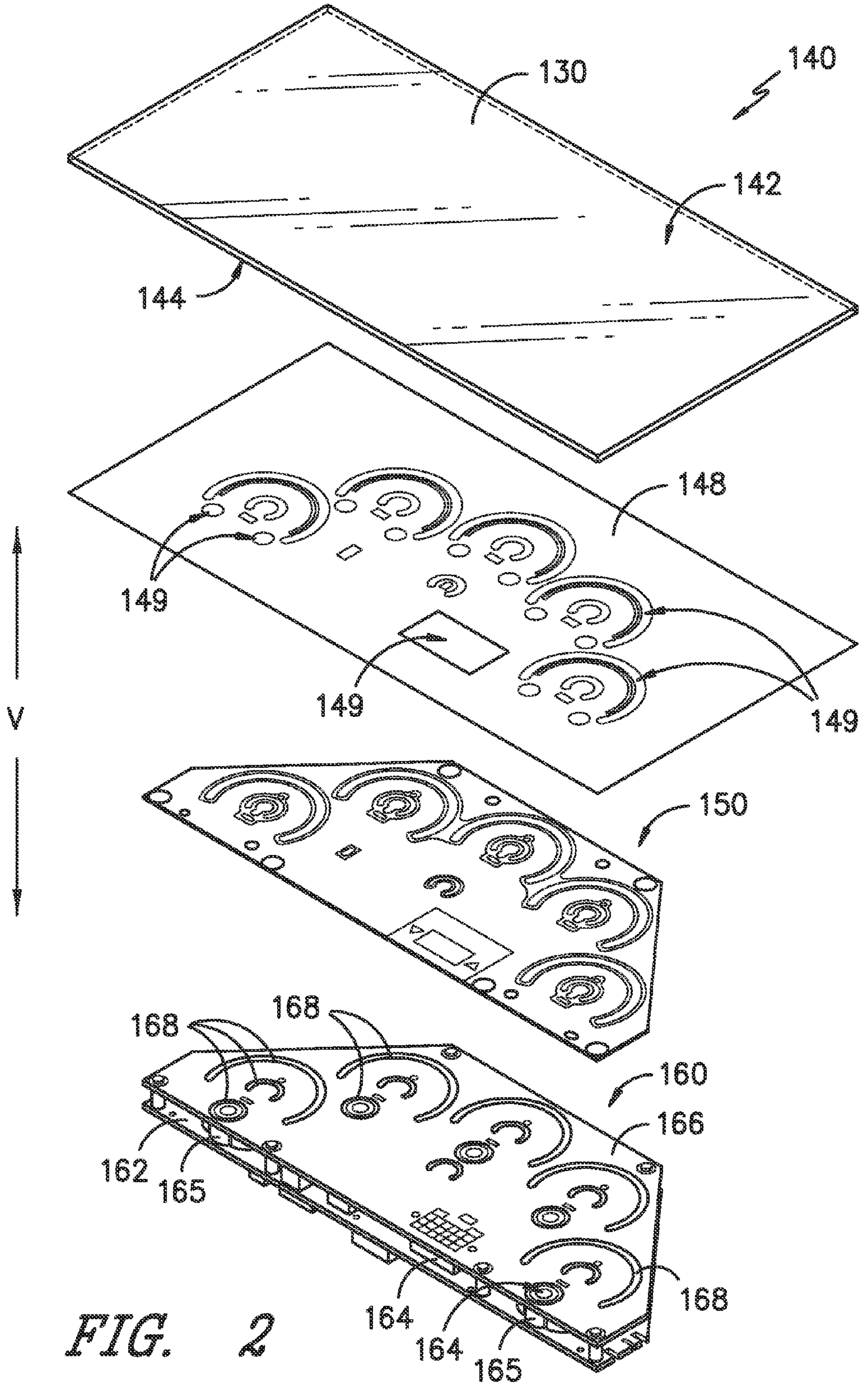
FIG. 2 provides an exploded view of an exemplary embodiment of a user interface assembly of the present subject matter.

FIG. 2 illustrates an exploded view of user interface assembly 140 of cooktop 100. As shown, a user of cooktop appliance 100 may input and receive information regarding the operation of cooktop 100 at user interface substrate 130, which can be a portion of panel 110 as previously described. A variety of text, digits, and/or symbols may be printed on user interface substrate 130 to indicate, e.g., the heat setting of a heating assembly 120 or the area of user interface substrate 130 to touch to input certain information. In alternative embodiments, no text, digits, or symbols may appear in or on user interface substrate 130 unless cooktop 100 is in use.

More specifically, user interface substrate 130 may include a primary surface 142 that is accessible by the user, e.g., to input information regarding the operation of appliance 100. User interface substrate 130 further may include a secondary surface 144 opposite primary surface 142. Primary surface 142 and secondary surface each define a plane, and the plane of primary surface 142 extends parallel to the plane of secondary surface 144. Further, in the exemplary embodiment shown in FIG. 2, secondary surface 144 is spaced apart from primary surface 142 along the vertical direction V such that primary surface 142 is a top surface of substrate 130 and secondary surface 144 is a bottom surface of substrate 130. In other embodiments, user interface substrate 130 may be generally vertical such that secondary surface 144 is spaced apart from primary surface 142 along a horizontal direction (i.e., along a direction perpendicular to the vertical direction V). In still other embodiments, user interface substrate 130 may extend at an angle to the vertical direction V, e.g., may be angled for more convenient access by a user. In any event, secondary surface 144 is spaced apart from primary surface 142 along a direction perpendicular to the plane defined by primary surface 142.

As shown in FIG. 2, user interface assembly 140 may include a display assembly 160 for receiving inputs from user interface substrate 130 and displaying information in or on user interface substrate 130. In the exemplary embodiment shown in FIG. 2, display assembly 160 includes a first printed circuit board 162 positioned below user interface substrate 130 along the vertical direction V. First printed circuit board 162 may include one or more light sources 164 for illuminating one or more features of user interface assembly 140. Each light source 164 may be, e.g., a polychromatic light emitting diode ("LED") such as a white LED, an incandescent lamp, or any other appropriate light source. In other embodiments, each light source 164 may be, e.g., a monochromatic light emitting diode ("LED"), such as a blue or red LED, a neon lamp, or any other appropriately colored light source. Further, light sources 164 of first printed circuit board 162 need not be the same type, size, or color, e.g., each illuminated feature of user interface assembly 140 may utilize a different type of light source and larger features may utilize multiple light sources to achieve the desired brightness and/or uniformity of brightness.

One or more light guides 165 may be provided for guiding light from light sources 164 toward user interface 130, e.g., light guides 165 may surround one or more light sources 164 to guide light toward user interface 130. Light guides 165 may be formed with air channels for guiding light toward user interface 130 or light guides 165 may comprise light pipes (e.g., clear plastic structures) to convey light from light sources 164 to user interface substrate 130; other configurations of light guides 164 may also be used. First printed circuit board 162 also may include elements or components for controlling user interface assembly 140 and/or cooktop appliance 100.

Display assembly 160 also may include a second printed circuit board 166 positioned above first printed circuit board 162 but below user interface substrate 130 along vertical direction V. Second printed circuit board 166 may include a capacitive touch sensing system, whereby cooktop 100 is controlled at least in part through touch inputs on user interface substrate 130 by a user of cooktop 100, e.g., through capacitive touch input components 132. Second printed circuit board 166 may also include a plurality of apertures 168 for the passage of light from light sources 164 to user interface substrate 130. In some embodiments, only one printed circuit board may be provided, with the one printed circuit board having the desired components and capabilities attributed to first printed circuit board 162 and second printed circuit board 166. In such a single-board embodiment, light sources 164 may face downwards (that is, away from user interface substrate 130) and light guides 165 may be positioned on the side of the circuit board opposite the side facing user interface substrate 130. Light guides 165 may be configured to reflect light from light sources 164 such that the light from light sources 164 directed away from user interface substrate 130 is reflected back toward the printed circuit board, exiting through apertures 168 in the circuit board to be directed toward user interface substrate 130.

As further shown in FIG. 2, a light transmissive layer 150 is disposed between user interface substrate 130 and light source or sources 164. In some embodiments, light transmissive layer 150 is positioned between user interface substrate 130 and second printed circuit board 166. In alternative embodiments, light transmissive layer 150 may be disposed between first printed circuit board 162 and second printed circuit board 166.

In some embodiments, light transmissive layer 150 is a light diffusion or diffusive layer, i.e., a diffuser, that diffuses the light from light sources 164 to provide uniform illumination of text, digits, graphics, or other features in or on user interface substrate 130. More particularly, diffuser 150 disburses light from light source 164 to provide uniform brightness across the illuminated features of user interface assembly 140 and to broaden the field of view, i.e., to provide wider viewing angles, so the illuminated features are easily readable from off-axis positions. In such embodiments, light transmissive layer or diffuser 150 may be, e.g., a frosted or etched PET, acrylic, or polycarbonate film that is frosted or etched on at least one surface thereof. In other embodiments, light transmissive layer 150 is a graphics overlay, masking, or support layer that may be a clear layer of, e.g., a thin PET, acrylic, or polycarbonate film or other appropriate material for providing various graphics in or on user interface substrate 130 by passing light through layer 150.

Figure 3:
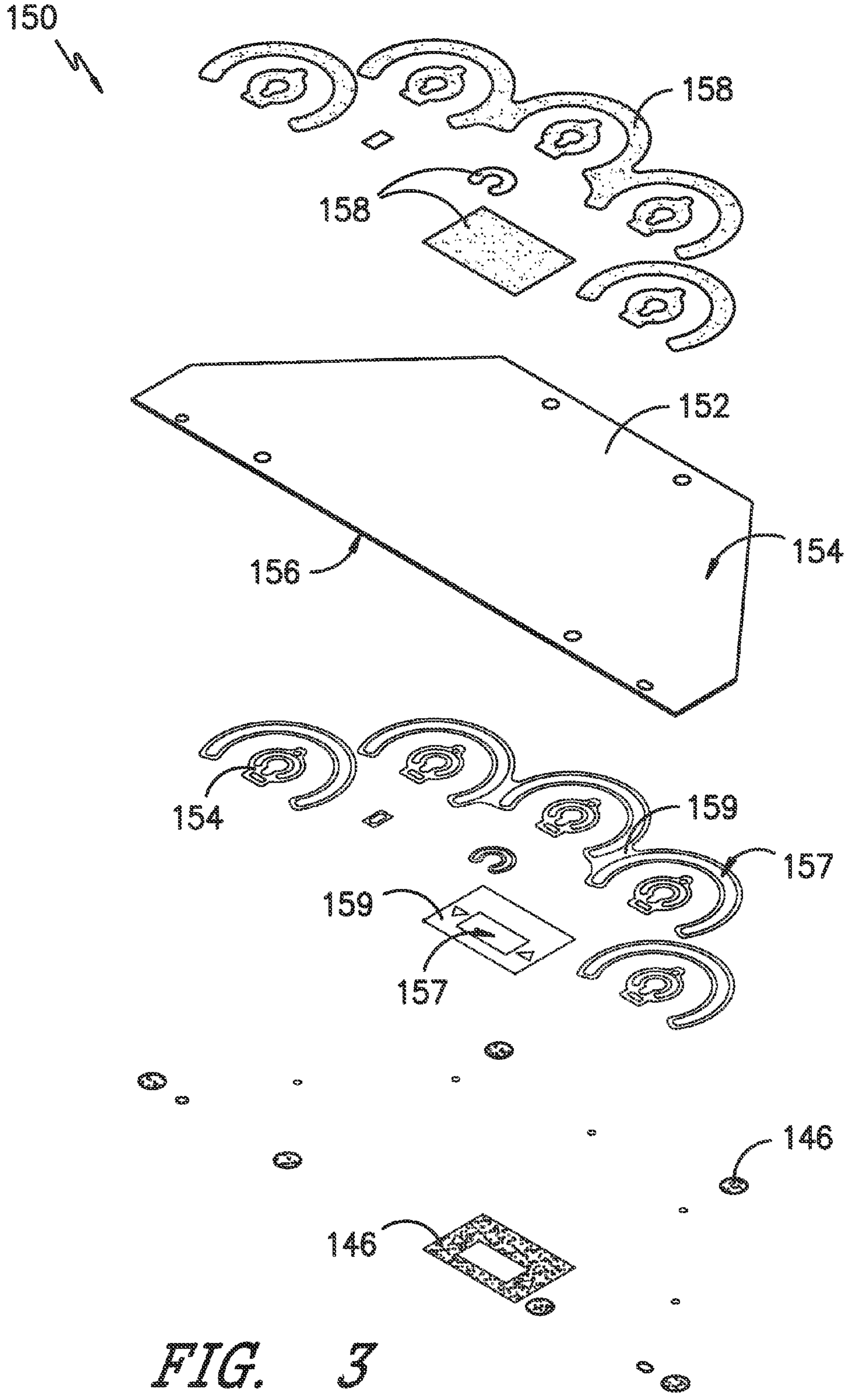
FIG. 3 provides an exploded view of an exemplary embodiment of a light transmissive layer of the present subject matter.

As further shown in FIG. 3, light transmissive layer 150 includes a support substrate 152. Support substrate 152 has a first surface 154 and a second surface 156. First surface 154 faces panel 110 and second surface 156 faces light source or sources 164. In embodiments where light transmissive layer 150 is a light diffusion layer or diffuser, support substrate 152 may be a diffusive substrate that diffuses light passing through the substrate. In such embodiments, as described above, support substrate 152 may be frosted or etched on at least one of first surface 154 or second surface 156; in some embodiments, both first and second surfaces 154, 156 may be frosted or etched. Support substrate 152 may have other configurations as well.

Using a masking material 146 applied to light transmissive layer 150, text, digits, and/or symbols may be formed such that the text, digits, and/or symbols are presented to the user of cooktop 100 when illuminated by light source 164. Additionally, making material 146 may be used to mask various features of the construction of user interface assembly 140, e.g., circuit board pads, part labels, etc., such that the features are not visible to a user of cooktop 100. Masking material 146 may be, e.g., a black ink or the like. Masking material 146 may be applied over a generally opaque ink 159 on second surface 156 of light transmissive layer 150, as further described below.

Continuing with FIG. 2, secondary surface 144 of user interface substrate 130 may be printed or coated with one or more layers of an opaque coating 148, such as a paint or a plastic film heat-bonded to secondary surface 144. Coating 148 is opaque such that components of user interface assembly 140 and/or cooktop appliance 100 are not visible through user interface substrate 130, which in the exemplary embodiment of FIG. 1 is a portion of translucent panel 110, as described. Coating 148 may be tinted with a suitable dye or pigment such that coating 148 is a desired color. For example, the color or shade of coating 148 may be specified by the color's x, y coordinates on the CIE Chromaticity Diagram. Thus, coating 148 provides a substantially solid background color and appearance for user interface substrate 130.

In some embodiments, one or more layers of an ink material may be included in addition to coating 148. The ink may be provided to outline or delineate one or more textual, graphical, symbolic, and/or other features to appear on or in user interface substrate 130. For example, rather than masking text on light transmissive layer 150, using ink applied to user interface substrate 130, text may be printed or otherwise affixed to secondary surface 144 of user interface substrate 130, and then coating 148 may be applied to secondary surface 144 such that the text appears on or in user interface substrate 130 against the background provided by coating 148. In some embodiments, the ink or other material may be applied to primary surface primary surface 142 or to both primary surface 142 and secondary surface 144. The ink may be any appropriate material for forming text, graphics, symbols, and/or other features on one or both surfaces 142, 144 of user interface substrate 130.

As shown in FIG. 2, portions of secondary surface 144 are left, uncoated, unpainted, or uncovered. These uncoated, unpainted, or uncovered portions form windows 149 through which light from light sources 164 may pass to illuminate features such as, e.g., text, digits, graphics, and/or symbols, in or on user interface substrate 130. Accordingly, the illuminated features of user interface assembly 140 appear against the background provided by coating 148. However, when not illuminated, components of user interface assembly 140 and/or appliance 100 may be visible through windows 149. Additionally or alternatively, light transmissive layer 150 may be have a color visible through windows 149 that is different from the color of coating 148, such that user interface substrate 130 is not uniform, contiguous, or consistent in color and appearance. For example, light transmissive layer 150 may be a diffuser film that generally is white in color such that the areas of user interface substrate 130 corresponding to windows 149 appear white in color, which may not match or may not substantially match the color of coating 148.

Referring now to FIG. 3, light transmissive layer 150 may include a translucent first ink 158 printed on at least a portion thereof, e.g., applied by screen printing or another appropriate process to one or more areas of layer 150. First ink 158 is configured such that user interface substrate 130 appears to be a substantially opaque, uniform color when no light from light sources 164 is passing through first ink 158, e.g., when appliance 100 is not in use, is not operating, or is in an off or deactivated state. For example, first ink 158 may be tinted a color substantially similar to the color of coating 148 applied to secondary surface 144 of user interface substrate 130. That is, first ink 158 may be tinted with a dye or pigment having a color with the same x,y coordinates on the CIE Chromaticity Diagram as the color selected for coating 148 such that the portions of user interface substrate 130 adjacent ink 158 appear as close as possible to the color of coating 148. Further, first ink 158 may be selected to have a suitable transmissivity for passing through light from light sources 164, i.e., ink 158 is at least partially light transmissive. Moreover, first ink 158 may be applied in as thin a layer as possible to reduce visible grain lines in the ink. In some embodiments, the transmissivity of first ink 158 is in the range of approximately 25% to approximately 50%, but in other embodiments, first ink 158 may have a different transmissivity, e.g., less than about 25% or greater than about 50%. Further, first ink 158 may be derived from a combination of different hues that, when combined in the right proportions, tint first ink 158 such that the color of ink 158 substantially matches the color of coating 148.

Additionally or alternatively, the color of first ink 158 may be selected to account for a color of display system 160. For example, if a surface of display assembly 160 facing light transmissive layer 150, such as, e.g., a top surface of second printed circuit board 166 as shown in FIG. 2, is black, the color of first ink 158 may be selected to account for the appearance of ink 158 against the black surface.

Other configurations of first ink 158 may be used as well. Moreover, it will readily be understood that ink 158 may be any suitable type of ink, such as, e.g., a UV-curable organic ink or any other suitable type of ink, and may be formed from any suitable process, such as, e.g., adding pigment to a carrier ink. It should be appreciated that the present subject matter is not limited to any particular type of ink or process of forming first ink 158. Thus, the foregoing examples are only for illustrative purposes and are not intended to limit the present subject matter in any way.

Figure 4:
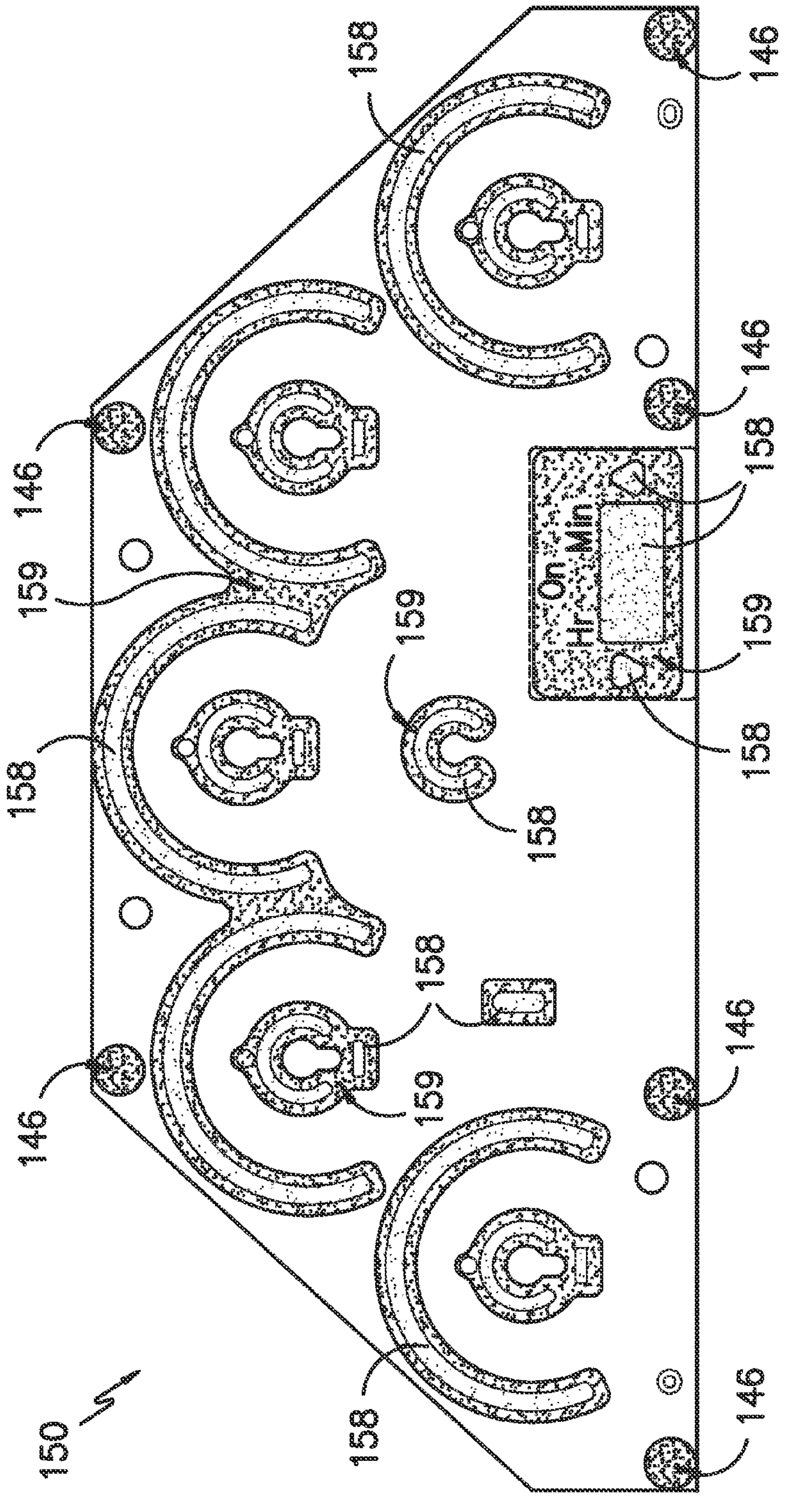
FIG. 4 provides a top view of the exemplary light transmissive layer of FIG. 3.

In some embodiments, such as the exemplary embodiment shown in FIGS. 3 and 4, an opaque second ink 159 also may be printed on at least a portion of light transmissive layer 150. Second ink 159 may be the same color as first ink 158 but much denser, i.e., much less transmissive than first ink 158. In some embodiments, second ink 159 may have a transmissivity of approximately 1% to approximately 2.5%, but in other embodiments, second ink 159 may have a different transmissivity, e.g., less than about 1% or greater than about 2.5% but less than the transmissivity of first ink 158. Second ink 159 generally is applied to support substrate 152 of light transmissive layer 150 around the edges of each window 149 such that second ink 159 defines voids 157 through which light from light sources 164 may pass to illuminate features of user interface assembly 140. Second ink 159 assists first ink 158 in masking or hiding components of user interface assembly 140 and/or appliance 100 without overly restricting the passage of light through light transmissive layer 150. In alternative embodiments, second ink 159 may be unnecessary and, thus, may be omitted. Further, similar to first ink 158, second ink 159 may be any suitable type of ink and may be formed from any suitable process.

In some embodiments, first ink 158 may be applied to an entire surface of light transmissive layer 150, e.g., ink 158 may be applied to all of first surface 154 of support substrate 152. In other embodiments, such as the exemplary embodiment of FIG. 2, first ink 158 may be applied to light transmissive layer 150 only in the areas corresponding to windows 149, i.e., where light transmissive layer 150 is adjacent windows 149. As shown in FIG. 3, in embodiments wherein light transmissive layer 150 is a diffuser, first ink 158 is applied to the surface of diffuser 150 that is not frosted or etched, which generally is first surface 154 facing user interface 130. Second ink 159 and masking material 146 may be applied to the frosted or etched second surface 156 facing display assembly 160. In other embodiments, first ink 158, second ink 159, and/or masking material 146 may be applied to the same surface of layer 150. As one example, masking material 146 may be applied to second surface 156, and first ink 158 may be applied to first surface 154 and second ink 159 may then be printed over first ink 158. The configuration of first ink 158 and second ink 159, including, e.g., the placement of inks 158, 159, the material from which inks 158, 159 are made, and the method or process by which inks 158, 159 are applied to layer 150, may be selected based on economic considerations. For example, some configurations of inks 158, 159 may lower the cost to produce appliance 100, and in some embodiments, second ink 159 may be omitted. Other configurations of first ink 158, second ink 159, and/or masking material 146 may be used as well.

Thus, first ink 158 is configured such that when light from light sources 164 is passing through windows 149, the illuminated features of user interface assembly 140 are clearly visible and are not shaded or tinted by first ink 158, but when no light from light sources 164 is passing through windows 149, user interface substrate 130 appears to be substantially opaque, consistent, and uniform in color and appearance. That is, first ink 158 disguises or hides as much as possible the internal components of user interface assembly 140 and/or appliance 100 that would otherwise be visible through windows 149 in coating 148, and/or the areas of user interface substrate 130 corresponding to windows 149 blend in with the remainder of user interface substrate 130. Accordingly, when appliance 100 is not in use, is not operating, or is in an off or deactivated state, appliance 100 has a "Dead Front" appearance, i.e., a substantially uniform, contiguous, or consistent appearance.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A user interface assembly, comprising:

a user interface substrate having a primary surface and a secondary surface opposite the primary surface, the primary surface accessible by a user of the user interface assembly;

an opaque coating selectively applied to the secondary surface of the user interface substrate such that a portion of the secondary surface is uncoated, the uncoated portion defining a window;

a display assembly spaced apart from the user interface substrate, the display assembly having a light source for directing light through the window to illuminate a feature of the user interface assembly; and a light transmissive layer disposed between the user interface substrate and the display assembly, the light transmissive layer comprising a support substrate having a first surface facing the user interface and a second surface facing the display assembly, and a first ink applied to at least a portion of the support substrate, the first ink configured such that when the light source is not directing light to the window, the user interface substrate appears to be an opaque, essentially uniform color.

2. The user interface assembly of claim 1, wherein the first ink is translucent.

3. The user interface assembly of claim 1, wherein the opaque coating applied to the secondary surface of the user interface substrate has a color, and where the first ink is colored to match the color of the opaque coating.

4. The user interface assembly of claim 1, wherein the light transmissive layer is a light diffusive material.

5. The user interface assembly of claim 1, wherein the first ink is applied to a portion of the support substrate of the light transmissive layer adjacent the window defined on the secondary surface of the user interface substrate.

6. The user interface assembly of claim 1, wherein the light transmissive layer further comprises a second ink applied to at least a portion of the support substrate.

7. The user interface assembly of claim 1, wherein the second ink is opaque.

8. The user interface assembly of claim 7, wherein the second ink is applied to the second surface of the support substrate.

9. The user interface assembly of claim 1, wherein the support substrate of the light transmissive layer is a plastic film that has been frosted on one of the first or second surfaces of the support substrate.

10. A cooktop appliance, comprising:

a cooking panel for supporting a cooking utensil thereon; and a user interface assembly including a user interface substrate having a primary surface and a secondary surface opposite the primary surface, the primary surface accessible to a user of the user interface assembly;

an opaque coating selectively applied to the secondary surface of the user interface substrate such that a portion of the secondary surface is uncoated, the uncoated portion defining a window;

a display assembly spaced apart from the user interface substrate, the display assembly having a light source for directing light through the window to illuminate a feature of the user interface assembly; and a light transmissive layer disposed between the user interface substrate and the display assembly, the light transmissive layer comprising a support substrate having a first surface facing the user interface substrate and a second surface facing the display assembly, and a first ink applied to at least a portion of the support substrate, the first ink configured such that when the light source is not directing light to the window, the user interface substrate appears to be an opaque, essentially uniform color.

11. The cooktop appliance of claim 10, wherein the first ink is translucent.

12. The cooktop appliance of claim 10, wherein the opaque coating applied to the secondary surface of the user interface substrate has a color, and wherein the first ink is colored to match the color of the opaque coating.

13. The cooktop appliance of claim 10, wherein the light transmissive layer is a light diffusive material.

14. The cooktop appliance of claim 10, wherein the user interface substrate is a portion of the cooking panel.

15. The cooktop appliance of claim 10, wherein the first ink is applied to a portion of the support substrate of the light transmissive layer adjacent the window defined on the secondary surface of the user interface substrate.

16. The cooktop appliance of claim 10, wherein the light transmissive layer further comprises a second ink covering at least a portion of the support substrate.

17. The cooktop appliance of claim 15, wherein the second ink is opaque.

18. The cooktop appliance of claim 15, wherein the second ink is printed on the second surface of the support substrate.

19. The cooktop appliance of claim 15, wherein the first ink has a color and the second ink has a color, and wherein the color of the second ink is selected to essentially match the color of the first ink.

20. The cooktop appliance of claim 10, wherein at least one of the first or second surfaces of the support substrate is frosted to diffuse light from the light source of the display assembly.

* * * * *